(12) United States Patent
Sato et al.

(10) Patent No.: US 8,122,764 B2
(45) Date of Patent: Feb. 28, 2012

(54) LIQUID STATE DETECTING SENSOR

(75) Inventors: Yoshikuni Sato, Nagoya (JP); Takashi Yamamoto, Nagoya (JP); Takeo Sasanuma, Aichi (JP); Yuki Mizuno, Gifu (JP)

(73) Assignee: NGK Spark Plug Co., Ltd., Aichi (JP)

( * ) Notice: Subject to any disclaimer, the term of this patent is extended or adjusted under 35 U.S.C. 154(b) by 39 days.

(21) Appl. No.: 12/651,735

(22) Filed: Jan. 4, 2010

(65) Prior Publication Data
US 2010/0101307 A1   Apr. 29, 2010

Related U.S. Application Data

(62) Division of application No. 10/585,207, filed as application No. PCT/JP2005/009038 on May 18, 2005, now abandoned.

(30) Foreign Application Priority Data

Oct. 29, 2004   (JP) ................................ 2004-317334

(51) Int. Cl.
*G01F 23/26* (2006.01)

(52) U.S. Cl. .................................................. 73/304 C
(58) Field of Classification Search ................. None
See application file for complete search history.

(56) References Cited

U.S. PATENT DOCUMENTS

| | | | |
|---|---|---|---|
| 2,848,666 A | 8/1958 | Zito | |
| 3,812,422 A * | 5/1974 | De Carolis | ................. 73/304 R |
| 5,326,082 A | 7/1994 | Ecktman et al. | |
| 6,250,152 B1 | 6/2001 | Klein et al. | |

FOREIGN PATENT DOCUMENTS

| | | |
|---|---|---|
| EP | 0927877 A2 | 7/1999 |
| JP | 01-151215 U | 10/1989 |
| JP | 08-296932 A | 11/1996 |
| JP | 09-21677 A | 1/1997 |
| JP | 09-152368 A | 6/1997 |
| JP | 9-152368 A | 6/1997 |
| JP | 2001-167837 A | 6/2001 |
| JP | 2002-317805 A | 10/2002 |
| JP | 2003-57093 A | 2/2003 |
| JP | 2004-510151 A | 4/2004 |
| WO | 99-28149 A1 | 6/1999 |
| WO | 02-27280 A1 | 4/2002 |

OTHER PUBLICATIONS

JP9021677, Kimiyoshi et al, Jan. 21, 1997.*

* cited by examiner

*Primary Examiner* — Hezron E Williams
*Assistant Examiner* — Alex Devito
(74) *Attorney, Agent, or Firm* — Sughrue Mion, PLLC (57) ABSTRACT

A sensor for detecting a state of liquid contained in a container comprising an outer tubular electrode made of an electrically conductive material, an inner electrode made of an electrically conductive material and disposed concentrically within the outer tubular electrode, a base end support member supporting base end portions of the outer tubular electrode and the inner electrode in a way as to provide insulation therebetween, and a leading end support member elastically supporting a leading end portion of the inner electrode on an inside of a leading end portion of the outer tubular electrode.

5 Claims, 10 Drawing Sheets

LIQUID STATE DETECTING SENSOR

CROSS REFERENCE TO THE RELATED APPLICATIONS

This is a divisional application of U.S. application Ser. No. 10/585,207 filed Jul. 3, 2006, which is a National Stage Application filed under §371 of PCT Application No. PCT/JP2005/009038, filed May 18, 2005, the above noted applications incorporated herein by reference in their entirety.

TECHNICAL FIELD

This invention relates to a liquid state detecting sensor (hereinafter also referred to simply as a sensor) for detecting (finding out) a state of liquid contained in a liquid container (tank) by measuring an electrostatic capacity between electrodes.

BACKGROUND TECHNIQUE

In an exhaust gas discharged from a diesel vehicle is contained nitrogen oxide (NOx) in addition to carbon monoxide (CO) and hydrocarbon (HC). Thus, in recent years, it has been practiced to reduce the toxic nitrogen oxide into a nontoxic gas. For example, it has been proposed to dispose a NOx selective reduction (SCR) catalyst in an exhaust gas discharge muffler of a diesel vehicle, put urea water serving as a reducing agent solution into a tank separately provided to the vehicle and spray the urea water over the above-described catalyst for thereby reducing NOx into nontoxic gas such as $N_2$. Since this system becomes incapable of urging NOx reduction but causes a large amount of discharge of NOx if urea water runs out, it has been taken such a measure of providing a container (hereinafter, also called a tank) for containing urea water with a sensor for measuring a liquid level (hereinafter, also called a water level) of urea water to be contained and issue a warning if the remaining amount of urea water becomes equal to or lower than a predetermined amount.

As an example of a sensor for measuring the water lever, there is known an electrostatic capacity type liquid state detecting sensor. The liquid state detecting sensor includes an elongated tube made of a conductor and serving as an outer electrode (outer tubular electrode) and measures an electrostatic capacity between the outer tubular electrode and an inner electrode in the form of an elongated post or pipe and disposed along the axial direction of and concentrically within the outer tubular electrode for detecting the water level from the electrostatic capacity. For example, in an electrostatic capacity type liquid state detecting sensor used for measuring a water level of liquid having a conductivity such as urea water, an insulation layer for preventing a short between the outer tubular electrode and the inner electrode is formed on the surface of the inner electrode and moreover a liquid state detecting sensor is set at a tank that serves as an object to be measured in such a manner that the axial direction of the outer tubular electrode coincides with the up and down direction of the water level. In case of measurement of a water level of such electrically conductive liquid, the electrostatic capacity of a portion that is not immersed in liquid depends upon an air layer in a gap between the inner and outer electrodes and the thickness of the insulation layer of the inner electrode. On the other hand, the electrostatic capacity of a portion immersed in the liquid depends only upon the thickness of the insulation layer since the conductive liquid becomes equal to the outer tubular electrode in the potential and becomes larger in the electrostatic capacity than the former. For this reason, the measured electrostatic capacity becomes larger as the portion immersed in the liquid increases, thus making it possible to detect the water level.

It is usual that such a liquid state detecting sensor is installed inside the tank in such a manner that the axial direction of the outer tubular electrode coincides with the up and down direction of the water level. For example, in case the outer tubular electrode (and inner electrode) is installed in a state of being suspended from a ceiling of the tank to the inside thereof, the liquid state detecting sensor is fixed (or supported) at the base (upper) end of the outer tubular electrode to (or on) a base end support member having a means for installation on the tank so that the base end side of the outer tubular electrode is disposed on the ceiling side. On the other hand, the inner electrode is fixed at a base end portion to the base end side of the outer tubular electrode in a way as to be disposed inside the outer tubular electrode and maintain insulation between the inner electrode and the outer tubular electrode. However, since the respective electrodes are put into, so to speak, a cantilever support condition of being free at the leading end sides by such fixing and supporting of the both electrodes only at the base end portions thereof, inclination of the respective electrodes in the radial direction or bending deformation thereof may occur when the sensor is put in such a using condition where the sensor is subjected to vibrations or in a condition where an external force is applied to the sensor along the lateral direction thereof. For this reason, the dimensions of the space between the both electrodes become unstable or contact of the both electrodes may be caused in some case, thus making it impossible to measure the electrostatic capacity accurately. Further, by repetition of such inclination or deformation, a large stress may be caused in each electrode, particularly at the base of the inner electrode, and therefore there is a danger of the electrode being broken.

For this reason, it has been practiced, in such a sensor, to dispose a spacer or a support member between the both electrodes, which serves as a means for stabilizing the dimensions of the space between the electrodes or an inner electrode support means for holding the dimensions of the space between the both electrodes constant. For example, a technique of disposing a plurality of spacers made of an insulating material around and longitudinally of the electrode so that the both inner and outer electrodes are held concentric is known (Patent Document 1). Further, a technique of disposing, at the leading end portions of the both inner and outer electrodes, a support member made of insulating resin between the electrodes and holding the interval (dimensions of the space) between the both electrodes constant while insulating between the electrodes by the support member (Patent Document 2).

Patent Document 1: Published Japanese Utility Model Application No. 1-151215.

Patent Document 2: Published Japanese Patent Application No. 9-152368

However, since the support means for the inner electrode in the former document requires a plurality of spacers, increase in the number of parts is incurred. Further, since it is necessitated to first dispose the spacers on the outer circumferential surface of the inner electrode and thereafter insert them under pressure (insert them) into the outer electrode through one end opening, the assembly work is difficult. Further, the technique of disposing the support member made of resin between the electrodes is encountered by the following problem since the support member is made of resin and therefore it is difficult for vibrations and external force to be absorbed by the support member between the both electrodes. First, when the support member is disposed between the both electrodes (leading ends) under a condition where the axes of the both electrodes are not correctly in line due to some error in manufacture and assembly, a lateral residual stress is caused in each electrode or each electrode is acted upon by a partial load and therefore there may be caused such a case in which one of the electrodes is broken at the base thereof. On the other hand, to prevent occurrence of such a case, it is necessitated to make considerably higher the dimensional accuracy of the parts including the electrodes, and therefore increase in the manufacturing cost is incurred. Further, since the usual support member made of resin is hard, vibrations are transmitted between the both electrodes by way of the support member. Thus, in case of, for example, such an inner electrode that has an insulating layer on the surface, there is a danger of the insulating layer being liable to be damaged and the insulating ability being destroyed.

SUMMARY OF THE INVENTION

The present invention has been made in view of such problems and has for its object to provide a liquid state detecting sensor that is free from a problem of increase in the number of parts and a problem in assembly and capable of absorbing an error in support of electrodes, while supporting the electrodes without causing, even in case an inner electrode is formed with an insulation layer on the surface, any damage to the layer.

To accomplish the above object, there is provided according to an aspect of the present invention a liquid state detecting sensor for detecting a state of liquid contained in a liquid container, including an outer tubular electrode made of a conductor, an inner electrode made of a conductor and disposed within and along an axial direction of the outer tubular electrode and a base end support member that supports the outer electrode and the inner electrode at base end sides thereof while maintaining insulation between the outer tubular electrode and the inner electrode, characterized in that a leading end support member made of an elastic body is disposed outside the inner electrode and inside the outer tubular electrode and elastically supports a leading end or a near leading end portion of the inner electrode upon an inside of the outer tubular electrode. In the meantime, disposing the leading end support member made of an elastic body outside the leading end or the near leading end portion of the inner electrode and inside the outer tubular electrode encompasses disposing directly therebetween and disposing indirectly therebetween by way of another member.

According another aspect of the present invention, there is provided a liquid state detecting sensor, characterized in that the leading end support member is inserted under pressure into a place outside the leading end or the near leading end portion of the inner electrode and inside the outer tubular electrode.

Further, according to a further aspect of the present invention, there is provided a liquid state detecting sensor, characterized in that the leading end support member has at an outer circumferential surface a protrusion that protrudes outward and the outer tubular electrode has at a near leading end portion a through hole that extends radially through the near leading end portion, the protrusion being fitted in the through hole when the outer tubular electrode is inserted under pressure into the place outside the inner electrode and inside the outer tubular electrode.

According to a further aspect of the present invention, there is provided a liquid state detecting sensor, characterized in that the protrusion of the leading end support member has at an outer surface thereof an inclined portion, the protruding amount of which inclined portion in the radial direction of the leading end support member reduces gradually in the direction in which the leading end support member itself is inserted under pressure.

According to a further aspect of the present invention, there is provided a liquid state detecting sensor, characterized in that the protrusion of the leading end support member has at an outer surface thereof an inclined portion, the protruding amount of which inclined portion in the radial direction of the leading end support member reduces gradually in the direction in which the leading end support member itself is inserted under pressure and has at a rear end of the inclined portion, which constitutes a maximumly protruded section, a chamfer, the protruding amount of which chamber in the radial direction of the leading end support member reduces gradually rearward.

According to a further aspect of the present invention, there is provided a liquid state detecting sensor, characterized in that the leading end support member has at an inner circumferential surface a plurality of inward protrusions that protrude inward and are arranged with angular intervals when observed in the axial direction, and the inward protrusions elastically support the inner electrode.

According to a further aspect of the present invention, there is provided a liquid state detecting sensor, characterized in that the leading end support member is inserted under pressure into a place outside the leading end or the near leading end portion of the inner electrode and inside the outer electrode, and the inward protrusions have guides that are shaped to flare in the direction in which the leading end support member itself is inserted under pressure.

According to a further aspect of the present invention, there is provided a liquid state detecting sensor, characterized in that the leading end support member has a bottomed tubular shape including a tubular body portion disposed outside the inner electrode and inside the outer electrode, the leading end support member further has at a bottom thereof a through hole communicated with an outside of the liquid state detecting sensor itself, and the through hole constitutes, together with communication recesses located between the adjacent inward protrusions, a flow passage.

According to a further aspect of the present invention, there is provided a liquid state detecting sensor for detecting a state of liquid contained in a liquid container, including an outer tubular electrode made of a conductor, an inner electrode made of a conductive material and disposed within and along an axial direction of the outer tubular electrode, and a base end support member that supports the outer electrode and the inner electrode at base end sides thereof while maintaining insulation between the outer tubular electrode and the inner electrode, characterized in that a leading end support member that has an elastic body at one of an outer circumferential surface and an inner circumferential surface is disposed outside the inner electrode and inside the outer tubular electrode, and a leading end or a near leading end portion of the inner electrode is supported upon an inside of the outer tubular electrode by the leading end support member.

According to a further aspect of the present invention, there is provided a liquid state detecting sensor, characterized in that the elastic body is rubber.

According to a further aspect of the present invention, there is provided a liquid state detecting sensor, characterized in that the liquid is urea water.

According to the sensor of the present invention, the leading end or the near leading end portion of the inner electrode is elastically supported on the inside of the outer tubular electrode by the leading end support member such that the sensor does not cause any increase in the number of parts, can be assembled with ease and enables the inner electrode to be supported at the leading end stably. Further, since the leading end support member made of an elastic body is used in support of the inner electrode, an error in the dimension and in assembly of the electrodes, etc. can be absorbed. Further, even in case an insulation layer is formed on the surface of the inner electrode, it never occurs to cause damage to the layer. Namely, such a layer is thin and therefore is liable to be damaged by the support using the prior art hard resin support member when the sensor is used under the circumstances where the sensor is exposed to vibrations. However, since according to the present invention the inner electrode is supported by the leading end support member made of an elastic body, such a danger is small.

Further, according to the present invention, lock (prevention of coming out) of the leading end support member can be attained with ease and assuredness without adhesive or the like means. Further, since the protrusion of the leading end support member is provided with the inclined portion, the inclined portion serves as a guide at the time of insertion under pressure such that smooth insertion under pressure can be attained.

Further, according to the present invention, at the time of insertion of the leading end support member composed of an elastic body under pressure, there is obtained such an effect that the protrusion can be fitted in the through hole of the outer tubular electrode with ease. Detailed description to that effect will be made later.

Further, according to the present invention, since the inner electrode is elastically supported by the plurality of inward protrusions protruding inward, the contact area between the both is small. Accordingly, the resistance at the time of insertion under pressure can be reduced, and therefore the insertion under pressure can be made easier. Further, in case the insulation layer is formed on the surface of the inner electrode, prevention of damage of the insulation layer can be promoted by the degree corresponding to the reduced amount of resistance. Further, in case the inward protrusion is formed with the guide, the insertion under pressure can be made further easier and smoother.

In the sensor wherein the leading end support member is formed into a bottomed tubular shape and has the through hole at the bottom and the communication recess positioned between the adjacent inward projections and the through hole are communicated with each other, the following particular effects can be obtained. Namely, if the bottom of the leading end support member is closed and not provided with such communication as in the present invention, it is necessitated to provide separately the lower portion of the outer tubular electrode with a liquid inlet and outlet port (hole or slit) through which liquid existing in the space between the inside of the outer tubular electrode and the outside of the inner electrode can go in and out. When this is the case, even if the liquid inlet and outlet port is provided to the lower end of the outer tubular electrode, liquid still exists (remains) in the place lower than the lower end of the liquid inlet and outlet port and inside the outer tubular electrode, the lower limit of the liquid level within the measurement range of the sensor is determined by the lower end of the liquid inlet and outlet port. Accordingly, the portion between the lower end of the liquid inlet and outlet port and the lower end of the outer tubular electrode does not contribute to detection of the liquid level. In contrast to this, since according to the present invention the communication recess positioned between the adjacent inward projections constitute, together with the through hole, a flow passage, lowering (variation) of the liquid level is obtained inside the leading end support member irrespective of the provision of such an inlet and outlet port. For this reason, the sensor can enlarge the measurement range even if the sensor has the same overall length. Thus, if an object to be measured is within a predetermined measurement range, the overall length of the sensor can be made smaller so that the sensor can be smaller in size.

The leading end support member made of an elastic body according to the present invention will suffice if it can support the leading end or its adjacent portion of the inner electrode elastically on the inside of the outer tubular electrode. Accordingly, the leading end support member made of an elastic body is not limited to such one that is made of an elastic body in its entirety but can be configured so as to include at a portion thereof a non-elastic body. For example, the leading end support member having the elastic body at one of the outer circumferential surface and the inner circumferential surface may be disposed outside the inner electrode and inside the outer tubular electrode. In the meantime, it is suitable that the elastic body is made of rubber.

Although the sensor of the present invention is suited for detection of the state (liquid level, concentration, etc.) of various liquid, it is particularly suited if the liquid is urea water. Since the urea water has electrical conductivity, it is necessitated to form an insulation layer composed of fluorine resin on the surface of the inner electrode. On the other hand, in case the leading end of the inner electrode is elastically supported by a leading end support member as in the present invention, the insulation layer is effectively prevented from being damaged even if the sensor is acted upon by vibrations or an external force.

DETAINED DESCRIPTION OF THE INVENTION

Figure 1:
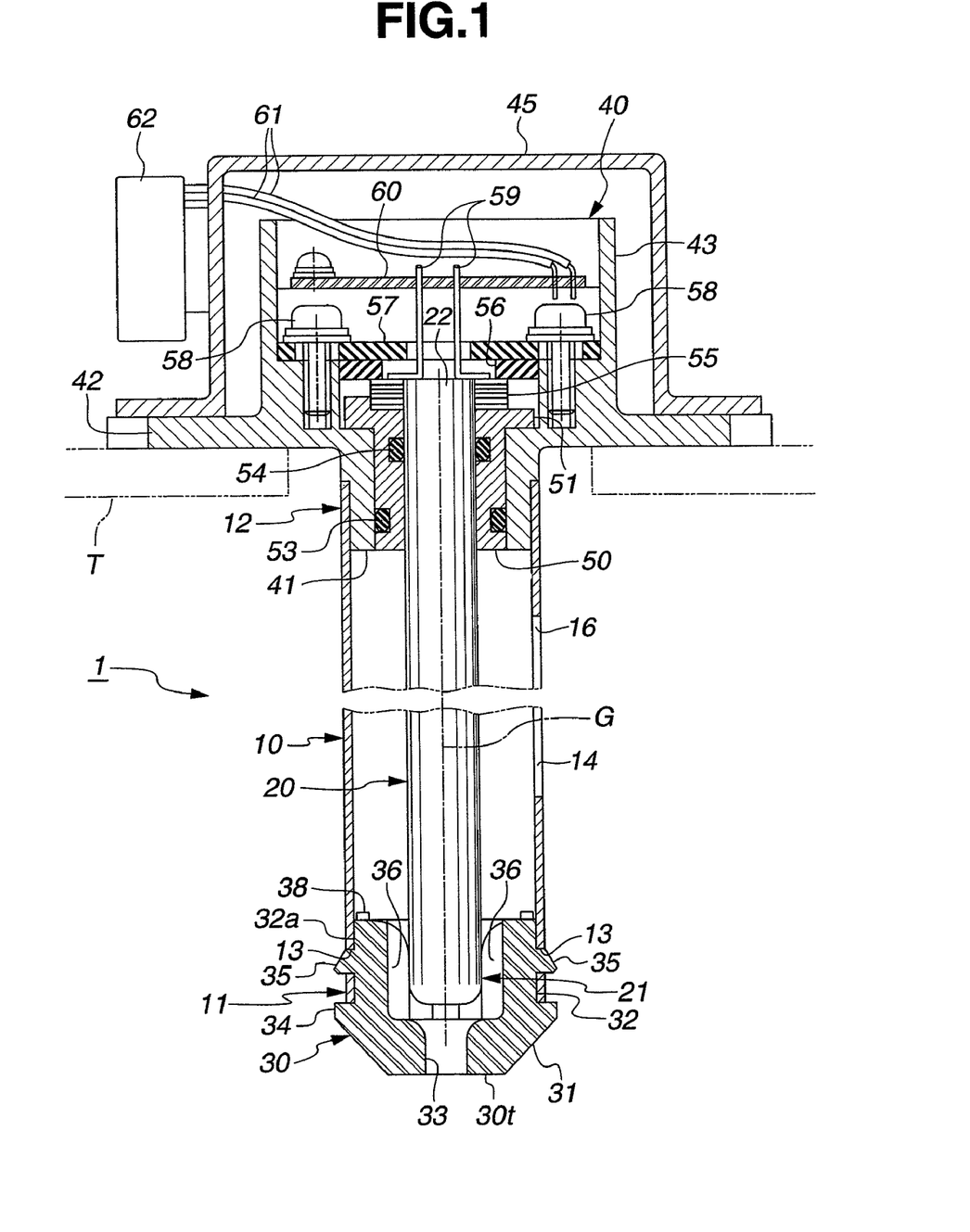
FIG. 1 is a longitudinal sectional view of an electrostatic type liquid state detecting sensor according an embodiment of the present invention.
Figure 2:
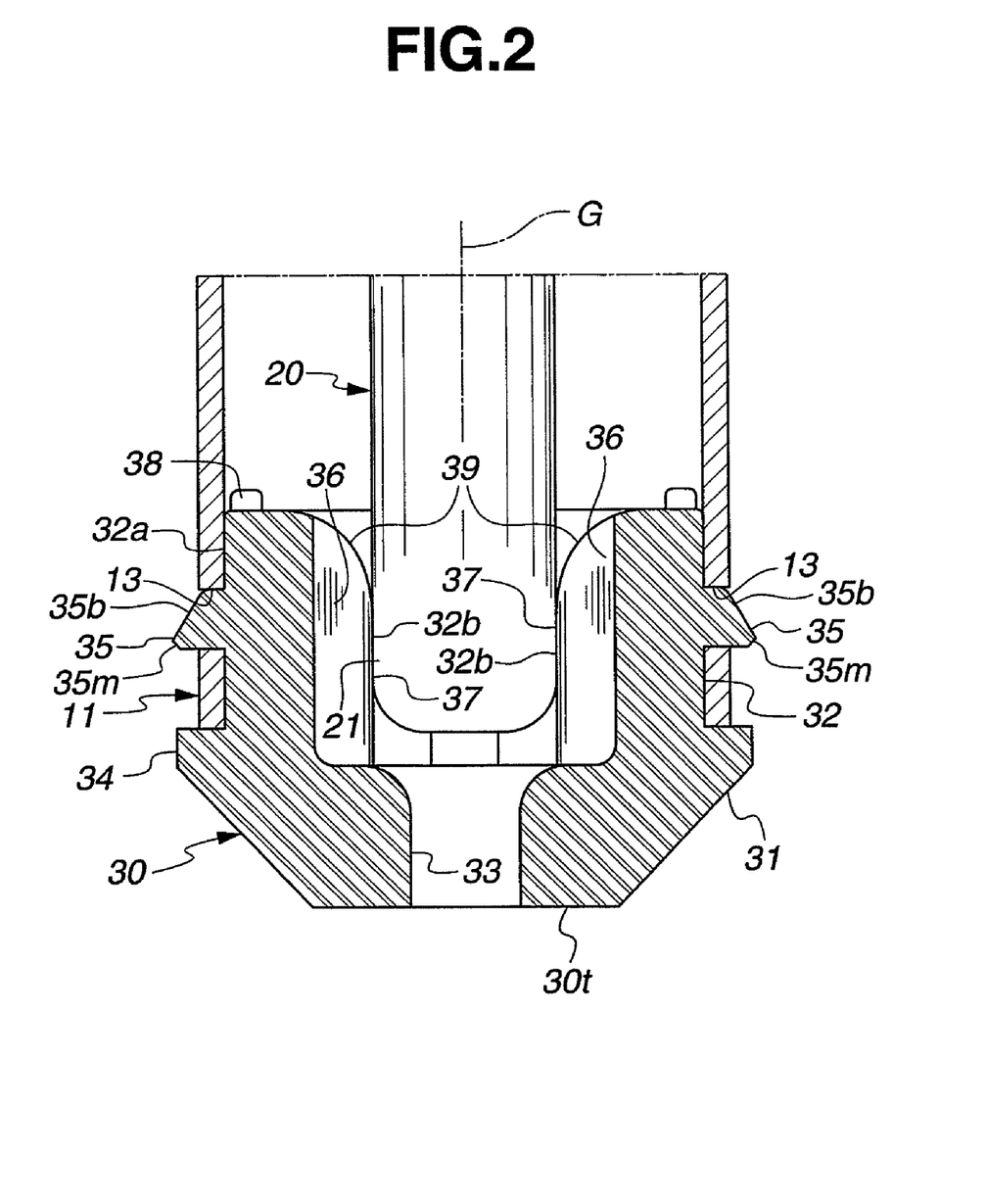
FIG. 2 is an enlarged view of a lower end portion which is a principal portion of FIG. 1.
Figure 3:
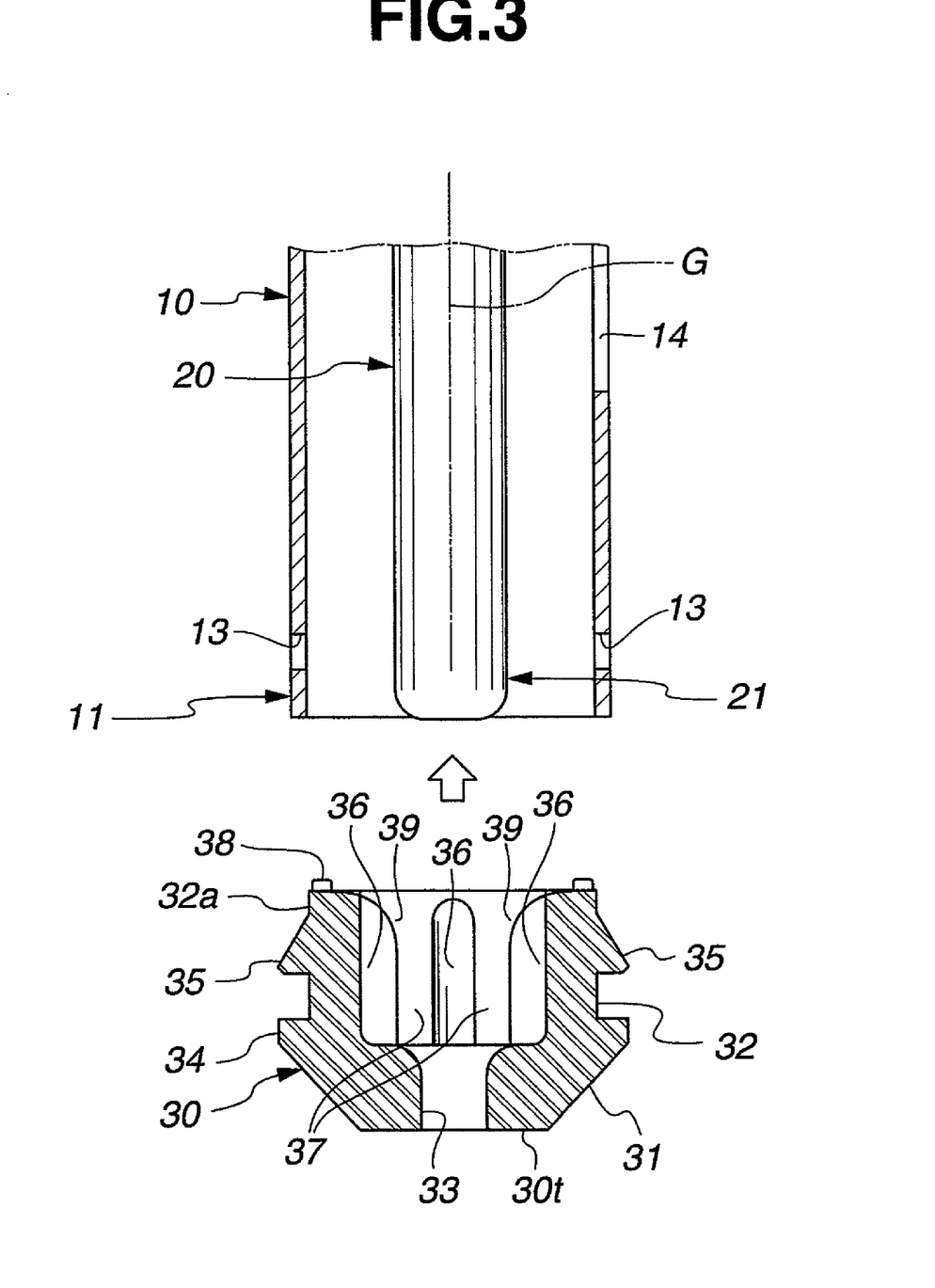
FIG. 3 is a sectional view of a principal portion of the sensor near a leading end, in a state before a leading end support member made of an elastic body is inserted under pressure thereinto.
Figure 4:
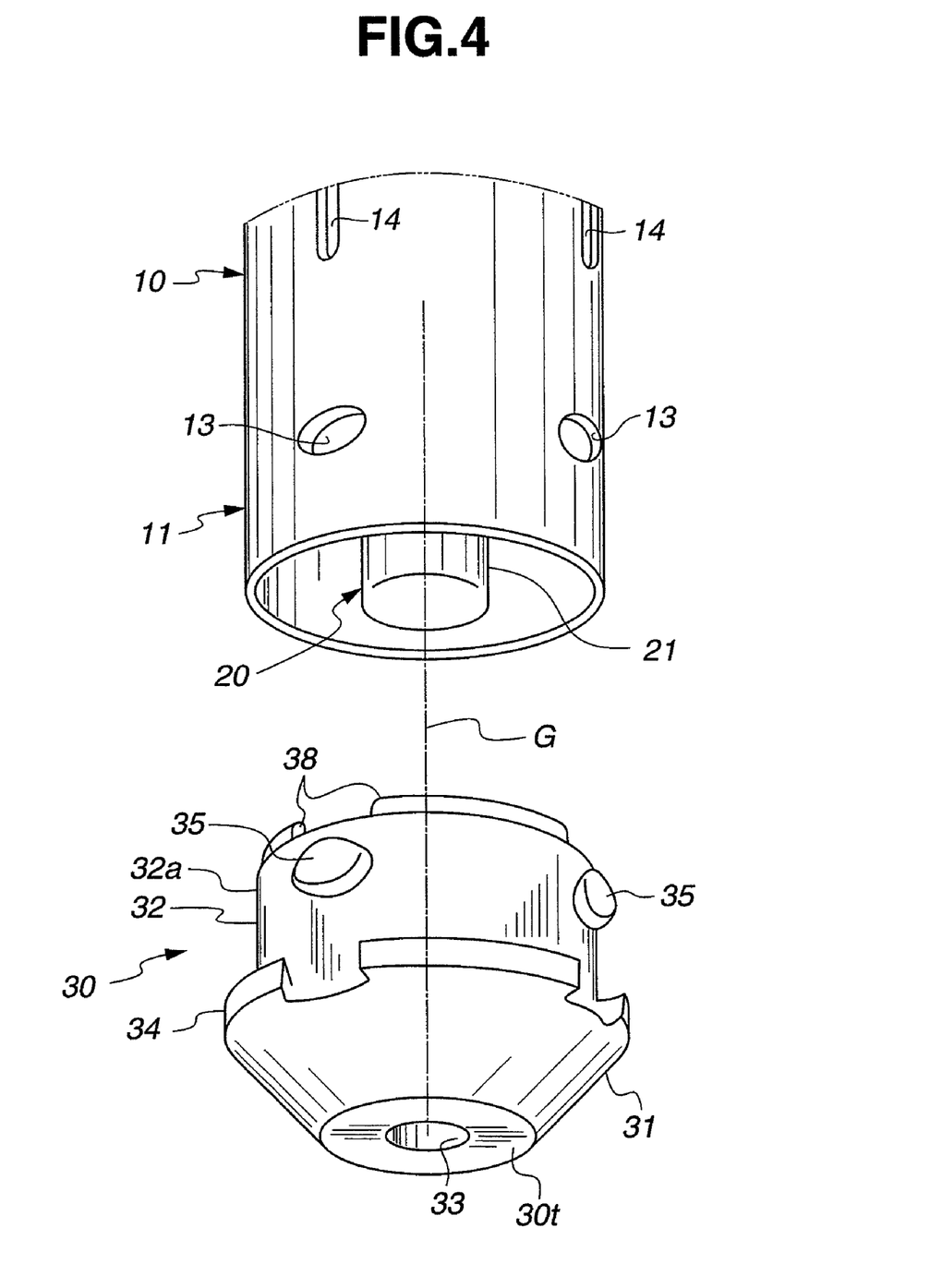
FIG. 4 is an enlarged perspective view of the near lower end portion of the sensor when observed from below.
Figure 5:
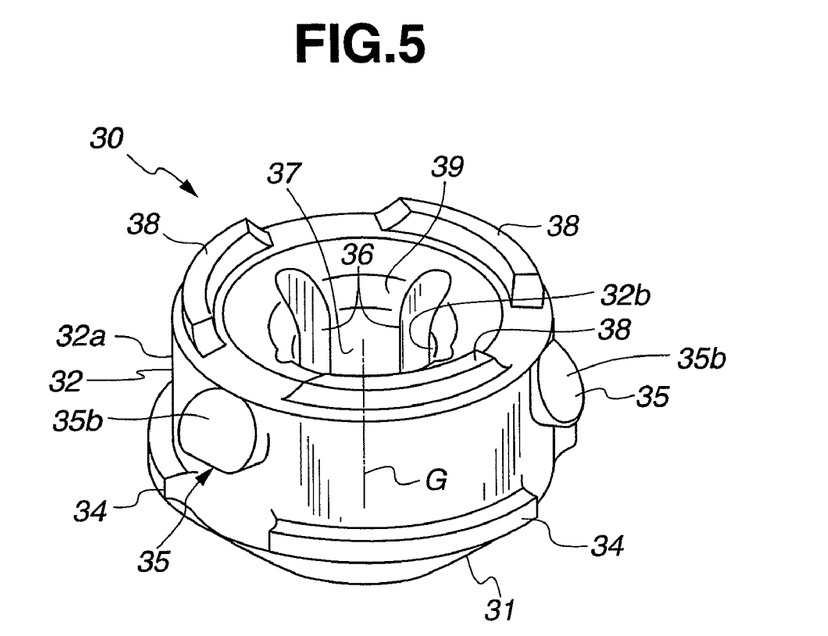
FIG. 5 is a perspective view of the leading end support member when observed from above.
Figure 6:
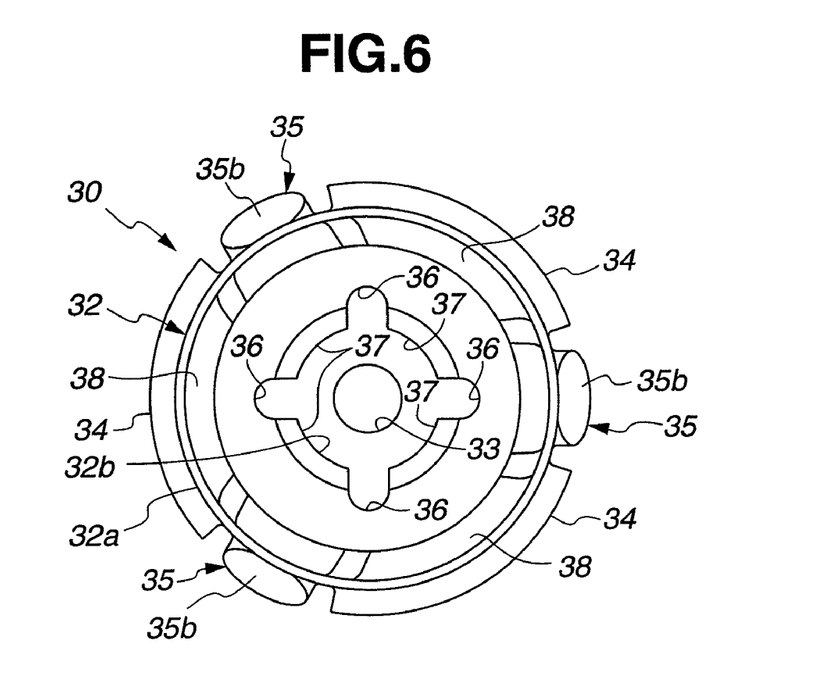
FIG. 6 is a plan view of the leading end support member.
Figure 7:
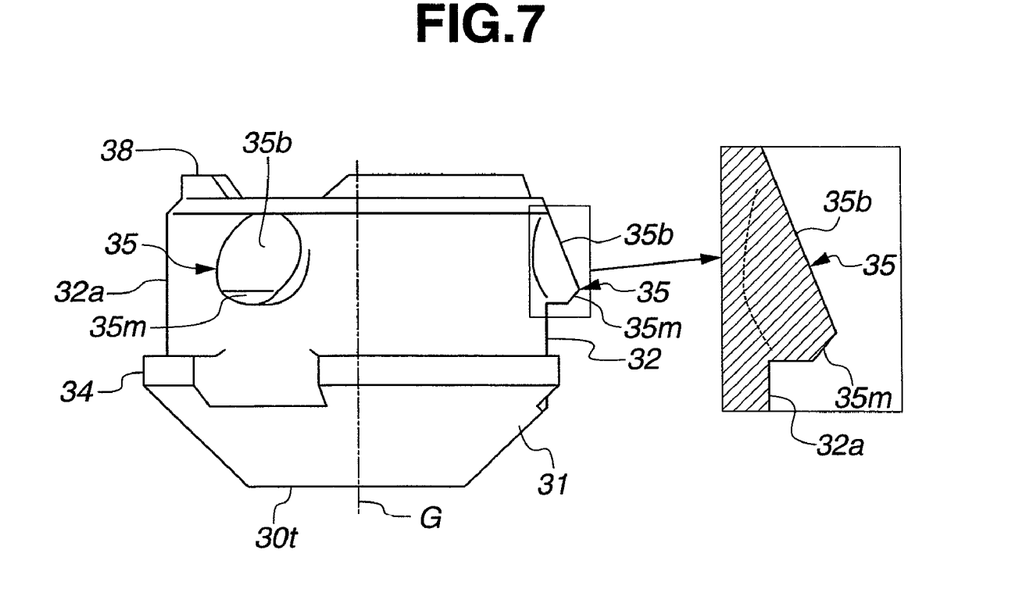
FIG. 7 is a side view of the leading end support member and an enlarged longitudinally sectional view taken along a plane extending through the axis of the leading end support member and through the center of the projection to show the projection and its adjacent portion.
Figure 8:
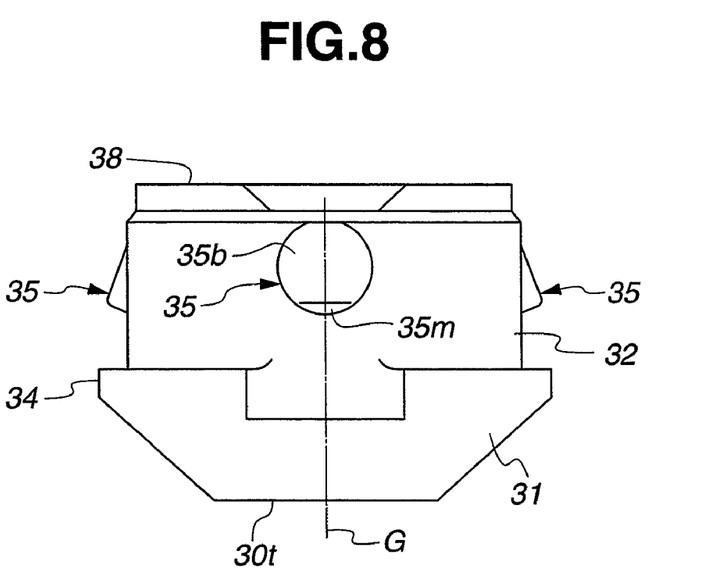
FIG. 8 is a view taken from the right-hand side of FIG. 7.

With reference to the drawings, an electrostatic capacity type liquid state detecting sensor according to an embodiment of the present invention will be described. First, with reference to FIG. 1, a liquid level sensor 1 will be described as an example of a liquid state detecting sensor. FIG. 1 is a longitudinal sectional view of the liquid level sensor 1. FIG. 2 shows a leading end portion of FIG. 1 (an enlarged view of a lower end portion of FIG. 1). FIG. 3 is a sectional view of a principal portion of a lower end side of the sensor in a state before a leading end support member made of an elastic body is inserted under pressure thereinto. FIG. 4 is an enlarged perspective view of the near lower end portion when observed from below.

The liquid level sensor (hereinafter also referred to simply as a sensor) 1 of this embodiment is attached to a tank holding urea water used for reduction of nitride oxide (NOx) contained in an exhaust gas of a diesel automotive vehicle and used for detecting the state of liquid within the tank (measurement of the level of urea water). In FIG. 1, the sensor is shown in a state of being attached to a ceiling portion (ceiling plate) of a tank T in a way as to suspend therefrom.

As shown in FIG. 1, the sensor 1 is made of an outer tubular electrode 10, a pillar-shaped inner electrode 20 disposed within the outer tubular electrode 10 and along the direction of an axis G of the outer tubular electrode 10, and a base end support member 40 that supports the outer tubular electrode 10 and the inner electrode 20 in a way as to hold them in a non-contact condition with each other. As will be described in detail, the both electrodes 10 and 20 are fixed at the sides of respective base end portions (upper end portions in the drawing) 12 and 22 to the base end support member 40 that serves as a means for attaching the electrodes to the tank T and are configured so that the leading ends of the both electrodes 10 and 20 are disposed at substantially the same position (height).

The outer tubular electrode 10 is made of an electrically conductive metallic material (SUS 304 in this embodiment) and includes an elongated, thin-walled circular tube (circular pipe) though its intermediate portion is omitted in FIG. 1. To a tubular wall of the outer tubular electrode 10 adjacent a leading end portion 11 (at a near leading end portion) corresponding to the leading end side of the liquid level sensor 1 (the lower end side in FIG. 1) are provided circular through holes (opening portions) 13 at three places in this embodiment and at equal angular intervals when observed in the direction of the axis G, into which through holes a leading end support member (hereinafter referred to as a rubber-made elastic body) 30 is inserted under pressure so that the leading end support member is installed in a way as to be kept from coming out. In the meantime, in this embodiment, at the circumferential surface of the outer tubular electrode and along generating lines are formed separately and in sequence from the leading end portion 11 side to the base end portion 12 (the base end side of the base end support member 40 of the liquid level sensor 1) narrow slits 14 and 16. The slits 14 and 16 are provided for the purpose of enabling liquid (urea water) or gas (air) to go into and out of the outer tubular electrode freely. In this embodiment, the slits are of the same shape, disposed at nearly the same intervals and furthermore arranged intermittently along three generating lines that are disposed at equal angular intervals when observed in the direction of the axis G. In the meantime, though not shown, a hole for venting air is formed at an adequate portion (at a near upper end portion in the drawing) of the outer tubular electrode 10.

Such an outer electrode 10, as shown in FIG. 1, is fitted (fitted in a surrounding manner) at the base end portion 12 on a hollow, cylindrical outer periphery of an electrode support portion 41 that is formed at a lower portion of the basic end support member (base member) 40 and welded thereto. The base end support member 40 has a flange 42 protruding radially outward for attachment to the tank T. In this embodiment, with the inside, upper end surface of the electrode support portion 41 is engaged a hollow cylindrical inner case 50 made of an insulating material by way of a flange 51 provided to an upper peripheral portion of the inner case. The inner electrode 20 is fixedly held at the base end portion (upper end portion in the drawing) inside the inner case 50 and disposed concentrically within the outer tubular electrode 10 and in a non-contact condition therewith. In the meantime, in this embodiment, the inner electrode 20 is an electrically conductive metallic bar (bar made of SUS 304) that is solid and pillar-shaped. However, the outer circumferential end surface of the leading end portion 21 side (the lower side in FIG. 1) is provided with a rounded chamfer 25. Further, at the surface of the inner electrode 20 is formed by coating an insulation layer (not shown) made of, for example, fluororesin and about 300 μm thick.

Such an inner electrode 20 is connected at the outer periphery adjacent the base end portion 22 with an annular pipe guide 55 and is supported within the outer tubular electrode 10 in a suspended state by placing the pipe guide 55 on the upper end surface of the inner case 50 thereby engaging the former with the latter. In the meantime, the inner case 50 is formed at the inner and outer circumferential surfaces with circumferential grooves in which liquid-tight and airtight ring packings 53 and 54 are installed. Further, the inner electrode 20 supported as described above is fixedly held inside a housing portion 43 by screws 58 that are screwed into the leading end support member by way of a resin pressure plate 56 and a metallic pressure plate 57 that are placed on the pipe guide 55. Within the housing portion 43 is disposed a relay circuit board 60 which is connected at unshown terminals with lead wires 59 for drawing from the inner electrode 20 and is connected to an external connector 62 by way of distributing cables 61. In the meantime, the circuit board 60 is connected at grounding side electrodes not shown to the base end support member 40, whereby the outer tubular electrode 10 is electrically connected to the grounding side. Indicated by 43 in the drawing is a cover of the housing portion 43.

Then, the inner electrode 20 supported by the electrode support portion 41 of the base end support member 40 is supported by a rubber elastic body 30 so that a leading end portion 21 is in non-contact with the leading end portion 11 of the outer tubular electrode 10. Namely, in the sensor of this embodiment, a body portion 32 of a rubber elastic body 30 having a bottomed tubular shape (cup-shape) is inserted under pressure from the lower side in FIG. 1 into a place inside the leading end of the outer tubular electrode 10 and outside the leading end (or the near leading end portion) of the inner electrode 20. By this, the outer circumferential surface 32a of the body portion 32 of the rubber elastic body 30 is put into a condition of contacting, under pressure, the inner circumferential surface of the near leading end portion of the outer tubular electrode 10, and the inner circumferential surface 32b of the body portion is put into a condition of contacting, under pressure, the outer circumferential surface (in this embodiment, the surface of the insulation layer) of the near leading end portion of the inner electrode 20. As described above in this embodiment, between the near leading end portions of the both electrodes 10 and 20 are interposed the rubber elastic body 30 having a bottomed tubular shape, whereby the leading end (or the near leading end portion) of the inner electrode 20 is elastically supported on the inside of the outer tubular electrode 10. However, in this embodiment, the outer circumferential surface 32a of the body portion 32 is provided with protrusions 35 protruding outward, and the protrusions 35 are configured so to fit in through holes 13 provided to the outer tubular electrode 10 through elastic deformation when the rubber elastic body 30 is inserted under pressure into the outer tubular electrode 10 and thereby keep the rubber elastic body from coming out.

Then, with reference to FIGS. 2 to 8, a concrete shape and structure of such a rubber elastic body 30, which is the gist of the present invention, will be described. Namely, the rubber elastic body 30 has a nearly circular cup shape when observed in the direction of the axis G. However, at the center of the bottom 30t is formed a through hole 33 that extends vertically therethrough. The inner diameter of the inner circumferential surface 32b of the tubular body portion 32 positioned above the through hole 33 is a little larger than the diameter of the through hole 33. At the inner circumferential surface 32b of the tubular body portion 32b are formed cuts 36 extending along the direction of the axis G. In this embodiment, the cuts 36 are provided at four places and at equal angular intervals when observed in a plan view, and the inner circumferential surface 32b portion of the tubular body portion 32, which is not formed with the cuts 36, is brought into contact, under pressure, with the outer circumferential surface of the inner electrode 20.

Namely, in this embodiment, as a result of the cuts 36 being provided, the inner circumferential surface 32b of the rubber elastic body 30 are formed with four inward projections 37 projecting inward which are arranged at equal angular intervals when observed in the axial direction, and the plurality of inward projections 37 elastically support the inner electrode 20. In the meantime, the upper end portion (the inside, upper end portion of the inward protrusion 37) of the tubular body portion 32 is rounded and formed into a large circular arc so as to constitute a guide 39 at the time of insertion-under pressure of the inner electrode 20. For example, the guide 39 is rounded by a rounded chamfer of a radius (e.g., 5 mm) larger than that (e.g., 3.5 mm) of the rounded chamfer of the periphery of the end surface of the leading end portion of the inner electrode 20. Further, in this embodiment, it is configured that the leading end surface of the inner electrode 20 does not reach the bottom 30t of the rubber elastic body 30 when the rubber elastic body 30 is inserted under pressure into the space between the leading ends of the both electrodes 10 and 20. By this, liquid (urea water) can flow from the through hole 33 of the bottom 30t into the inside of the outer tubular electrode 10 through the cuts 36 (corresponding to communication recesses between inward protrusions 37) that serve as a flow passage. In the meantime, it is desirable to form such a rubber elastic body 30 from a material having an anti-liquid property and it is suitable to determine the hardness of the rubber elastic body to be about Hs70. In this embodiment, the rubber elastic body is a single molding of EPDM.

The rubber elastic body 30 in this embodiment is tapered at the lower end portion (leading end portion) outer periphery 31, and the body portion 32 is nearly formed into a hollow cylindrical shape. However, at the lower end portion of the outer circumferential surface 32a of the body portion 32 and continuously from the tapering of the lower end portion outer periphery 31 are formed flanges 34 that protrude outward and are arranged circumferentially intermittently. The flanges 34 serve as a stopper when the rubber elastic body 30 is inserted under pressure into the outer tubular electrode 10. Further, in this embodiment, at the outer circumferential periphery 32a of the tubular body portion 32 are formed the protrusions 35 protruding outward as described above. The protrusion 35 in a free condition (before insertion-under pressure of the rubber elastic body 30) has at the outer side surface, as shown in an enlarged view of FIG. 7, an inclined portion 35b, the protruding amount of which inclined portion in the radial direction of the rubber elastic body 30 reduces gradually in the direction in which the rubber elastic body itself is inserted (upward in the drawing) such that there is not caused any obstacle to insertion-under pressure of the rubber elastic body 30 into the outer tubular electrode 10. Namely, the projection 35 is configured to have nearly a saw-tooth shape when observed in section taken by a plane that extends parallely through the axis G and through the center of the projection 35 when observed from the axis side. Furthermore, to the rear end of the inclined portion 35b, which constitutes a maximumly protruded section, is provided a chamfer 35m of inclination opposite to that of the inclined portion such that the protrusion 35 fits in the through hole 13 of the outer tubular electrode 10 easily at the time of insertion-under pressure of the rubber elastic body 30. In this embodiment, the protrusions 35 are provided in three places and arranged at equal angular intervals when observed in the direction of the axis G. In the meantime, such a rubber elastic body 30 in a free condition is configured so that the diameter of the outer circumferential surface 32a of the tubular body portion 32 is a little larger than the inner diameter of the outer tubular electrode 10 and the diameter of the inner circumferential surface 32b is a little smaller than the outer diameter of the inner electrode 20. Further, in this embodiment, at the upper end of the body portion 32 are disposed guides 38 at the time of insertion-under pressure, which are arranged in a circular array so as to have an outer diameter that is a little smaller than that of the body portion 32.

The sensor 1 of this embodiment, in which the both electrodes 10 and 20 are supported at the leading ends by the rubber elastic body 30, is mounted on a ceiling plate of the tank holding urea water by placing the flange 42 of the base end support member 40 in a seating manner on the ceiling plate by way of a packing (not shown) or the like and tightening screws or the like. In this manner, the both electrodes 10 and 20 are disposed in a suspended state within the tank T and detect the water level as the liquid state of urea water within the tank T.

Thus, in such a sensor 1 of this embodiment, the inner electrode 20 is elastically supported at the leading end by the rubber elastic body 30. Accordingly, the number of parts is not increased and the work in assembly can be easy since only insertion-under pressure of the rubber elastic body 30 is necessitated in the final stage of assembly. Further, the inner electrode 20 can be supported at the leading end stably since supported elastically. Further, since the electrode is supported by using the rubber elastic body 30, even if there is an error in the dimensions of the electrodes, etc. or an error in the assembly of the electrode, such as a slight inclination of an electrode, such an error can be absorbed by the elasticity of the rubber elastic body itself, thus not requiring a strict accuracy and making it possible to reduce the cost. In addition, since it is not the case that the inner electrode 20 is supported by a support member made of hard resin, it becomes possible to avoid an excessively large force (load) from being applied to the inner electrode 20 and therefore the durability can be made higher. Further, if the inner electrode 20, etc. of such a sensor 1 is subjected to vibrations and an external force, the insulation layer formed on the outer circumferential surface of the inner electrode 20 heretofore in use is liable to be damaged since it is thin and therefore there is a high possibility of some drawback being caused. However, in this embodiment, since the electrode is supported elastically by using the rubber elastic body 30, vibrations, etc. can be absorbed and the above-described possibility can be lowered. For this reason, in case the sensor is used for detecting the state of liquid having an electrical conductivity such as urea water and is used under a condition of being subjected to vibrations, a considerable effect can be obtained.

Particularly, since in this embodiment the protrusion 35 has the inclined portion 35b at the outer circumferential surface, its insertion under pressure can be attained with ease. Furthermore, since the chamfer 35m is provided to the rearward end of the inclined portion 35b, which constitutes a maximumly protruded section, in such a manner that the protruding amount of the chamfer in the radial direction of the rubber elastic body 30 decreases gradually rearward, the following effect is obtained. Namely, in this embodiment, the protrusion 35 at the outer circumferential surface of the rubber elastic body 30 is so shaped as to have the chamber 35m at the maximumly protruded section when observed in section taken by a plane that extends parallely through the axis G and through the center of the projection 35 when observed from the axis side. Hereinafter, the operation and effect of the protrusion 35 will be described.

Namely, in the process of inserting the rubber elastic body 30 into the outer tubular electrode 10, such a protrusion 35 cannot fit in the through hole 13 smoothly unless the protrusion 35 itself comes to the position for insertion into the through hole 13 with respect to the direction of the axis G. The same will be caused depending on the diameter of the through hole 13 if the protrusion 35 is provided with only the sawtooth-shaped inclined portion 35b. This is because though in the protrusion 35 provided with the saw-tooth-shaped inclined portion 35b as described above the inclination serves as a guide in the initial stage of the insertion-under pressure, the inclined portion 35b of the protrusion 35 is compressed or squeezed radially and gradually increasingly by the inner circumferential surface of the outer tubular electrode 10 during the process of inserting the rubber elastic body 30 into the inner circumferential surface of the outer tubular electrode 10 under pressure, and therefore the resistance to the insertion under pressure or the friction in the insertion under pressure becomes large. Due to this, the rear end of the inclined portion 35b of the protrusion 35 is deformed into the shape of being pulled rearward (in the direction opposite to the direction of the insertion under pressure), namely, into a rearward moved shape (or stretched shape). Accordingly, there may occur such a case in which though the rubber elastic body 30 is inserted under pressure into the outer tubular electrode 10 and the protrusion 35 is in a designed axial position for fitting in the through hole 13, the rear end of the inclined portion 35b can not go over the edge of the through hole 13 (the leading end side edge of the outer tubular electrode 10) due to deformation. Namely, for the reason that the rear end of the inclined portion 35b of the protrusion 35 is positioned a little closer to the leading end side than the edge of the through hole 13, which is near the leading end of the outer tubular electrode 10, the protrusion 35 cannot fit in the through hole 13. However, in case in the embodiment as described above the chamfer 35m is provided at the rear end of the protrusion 35, which constitutes a maximumly protruded section, the chamfer 35m portion can be positioned at the edge of the through hole 13, which is near the leading edge of the outer tubular electrode 10. Thus, even in the case the protrusion 35 does not correspond to the through hole 13 correctly, the chamfer 35m portion operates, together with the elasticity of the protrusion 35 itself, so as to go actively into the through hole 13 so that the protrusion 35 can fit in the through hole 13 with ease.

Further, since in the embodiment described above the inner electrode 20 is elastically supported by the plurality of inward protrusions 37 of the leading end support member 30, which protrude inward, the resistance at the time of insertion under pressure can be reduced and therefore the insertion under pressure can be attained with ease. For this reason, in case the inner electrode 20 having the insulation layer at the surface is used as in the above-described sensor 1, there is obtained such an effect that the insulation layer can be kept from damage. In the meantime, while in this embodiment the inner circumferential surface 32b of the leading end support member 30 is provided with the cuts 36 along the direction of the axis G so that the inward projections 37 are provided between the cuts and therefore the inward projections 37 are formed into the shape of a vertically extending rib, the inward protrusions 37 may be formed into the shape of a boss or island that protrudes inward, without extending vertically.

Figure 9:
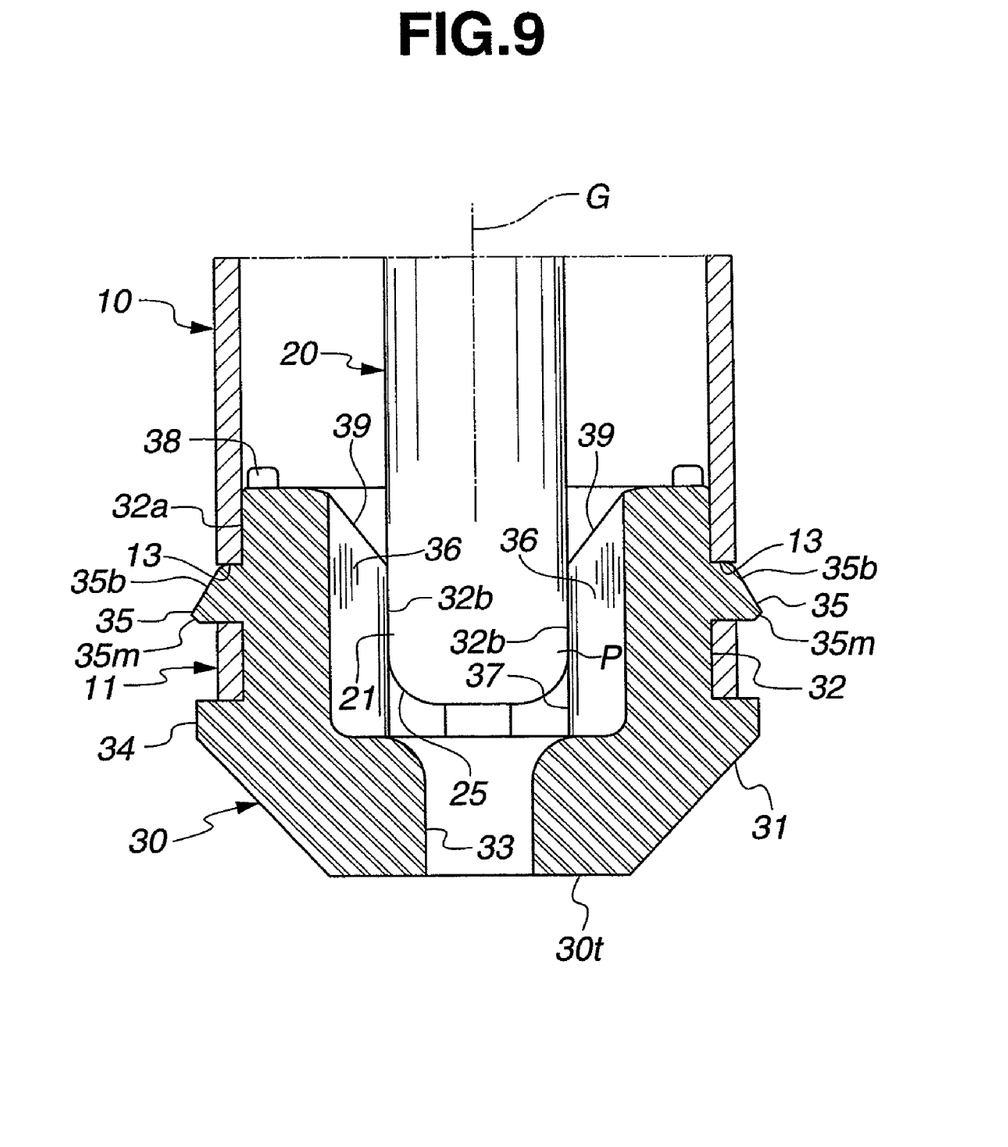
FIG. 9 is an enlarged view of a lower end portion which is a principal portion of the liquid state detecting sensor and shows another example of a guide of an inward projection.

Further, since in the above-described embodiment the inward projection 37 is provided with the guide 39, the insertion under pressure can be further easier or smoother. In the meantime, while in the above-described embodiment the guide 39 is shown as a rounded chamfer, any guide 39 will suffice if it allows the leading end support member 30 itself to have a flaring shape, i.e., allows the protruding amount of the inward protrusion 37 in the radial direction of the leading end support member 30 to reduce gradually in the direction of the insertion under pressure (the upward direction in FIGS. 1 to 3). Accordingly, as in another embodiment shown in FIG. 9, the guide 39 may be an oblique chamfer. In the meantime, in case a chamfer is such an oblique chamfer, a plurality of oblique chamfers of different inclinations may be employed or an oblique chamfer may be employed in combination with a rounded chamfer. Since FIG. 9 differs from FIG. 2 only in the guide 39 being an oblique chamfer, like and corresponding portions to those of the above-described embodiment are designated by like reference numerals and will not described again. This is the same in the following description.

Further, in the leading end support member 30 employed in the previous embodiment, a variation in the liquid level is also attained inside the leading end support member 30, following a variation of the liquid level within the tank T since the space (cuts 36) between the inward protrusions 37 is communicated with the through hole 33 provided at the center of the bottom 30t. For this sake, the measurement range (liquid level) of the sensor can be larger and therefore the sensor can be smaller in size. For example, while in the above-described embodiment the leading ends (lowest ends) of the outer tubular electrode 10 and the inner electrode 20 are disposed at the same height, the beginning point P of the rounded chamfer 25 along the axis G is the lowest level (liquid level) that can be measured.

In the meantime, while the rubber elastic body 30 has been described as a single molding, it may be an assembly of a plurality of separate bodies (moldings) if there is any obstacle to molding or the like. Further, while the rubber elastic body 30 has been described as being interposed between the electrodes by insertion under pressure, the rubber elastic body of this invention can be interposed between the electrodes not by insertion under pressure, namely, by using an adhesive or the like. Further, while the rubber elastic body 30 has been described as being fitted directly on the outer circumferential surface (the outer circumferential surface of the insulation layer) at the leading end of the inner electrode 20 and thereby interposed between the electrodes, a ring-shaped collar or the like for instance may be fitted on the leading end of the inner electrode 20 irrespective of the provision of an insulation layer and then a rubber elastic body may be fittingly disposed between the electrodes.

The present invention is not limited to the embodiment described above but various modifications may be made thereto without departing from the spirit of the invention. For example, while in the above described embodiment the rubber elastic body is described as being made of EPDM, the material of rubber is not limited to that material but will suffice if it has a liquid resistance to the liquid that is a subject to be measured, a durability and a suitable elasticity. The rubber elastic body may be made of various kinds of rubber such as silicon rubber, fluororubber and polychloroprene rubber or synthetic rubber. Further, the rubber elastic body may be configured to have a suitable shape and structure. In the meantime, while in the above described embodiment the through hole 33 is formed at the center of the bottom 30t of the rubber elastic body 30 to extend vertically therethrough and the cuts 36 are provided to the inside of the rubber elastic body to form a flow passage for going in and out of the liquid, such a through hole or the like is not always necessitated if the outer tubular electrode has an opening (liquid inlet) for allowing the liquid to go freely into the outer tubular electrode.

Figure 10:
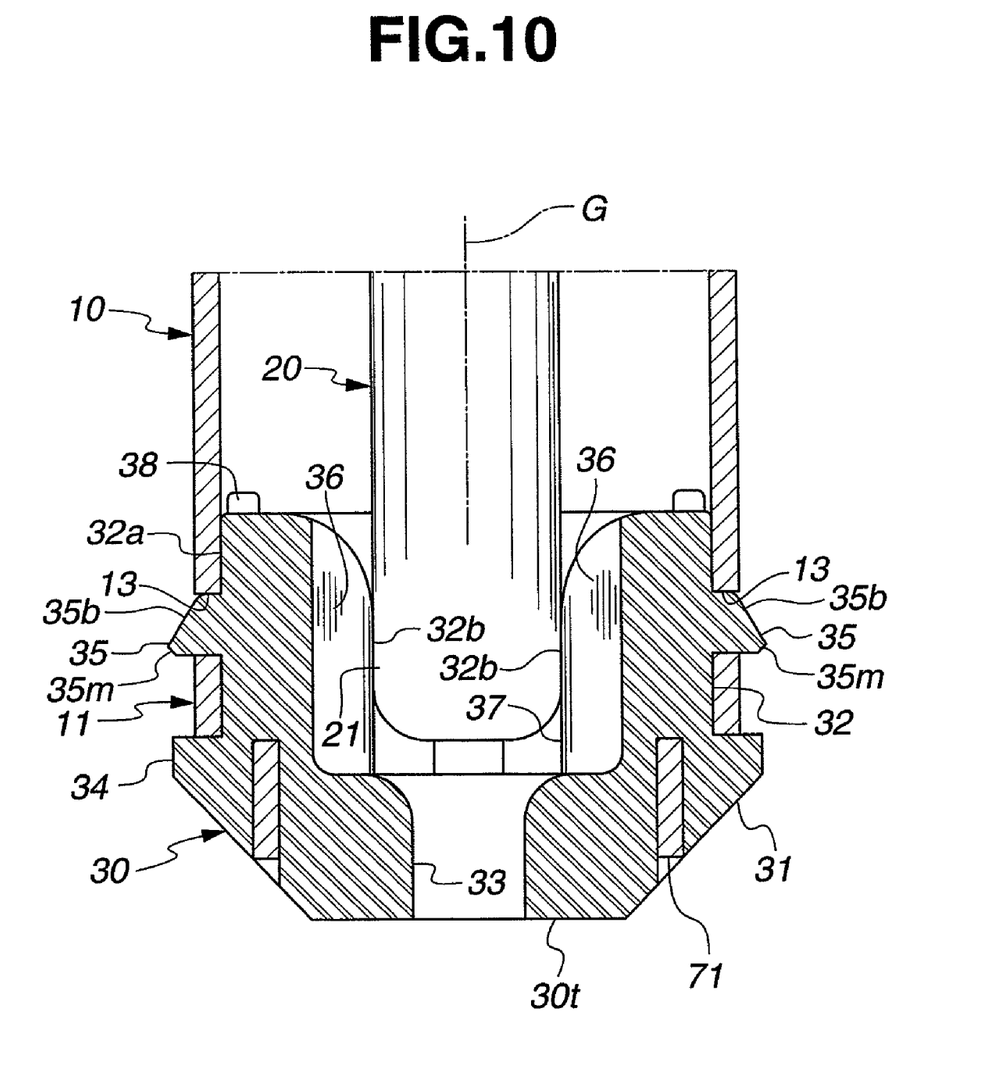
FIG. 10 is an enlarged view of the lower end portion of the liquid state detecting sensor, which is a principal potion and shows a leading end support member according to another embodiment.

Further, while in the foregoing the leading end support member 30 has been described as being entirely made of an elastic body (rubber), the leading end support member 30 in the sensor of the present invention is not always necessitated to be entirely made of an elastic body (rubber). Namely, as shown in FIG. 10, the above-described leading end support member 30 may be internally provided with a core member (metallic part or hard resin pipe (ring)) 71 in the form of an annular body (short pipe), in such a manner as to form an insert. In case the core member 71 is provided in such a manner to form an insert as described above, an effect of preventing deformation of the leading end support member 30 made of an elastic body such as rubber can be attained such that the force for fixedly holding the leading end support member 30 between the electrodes can be increased.

Figure 11:
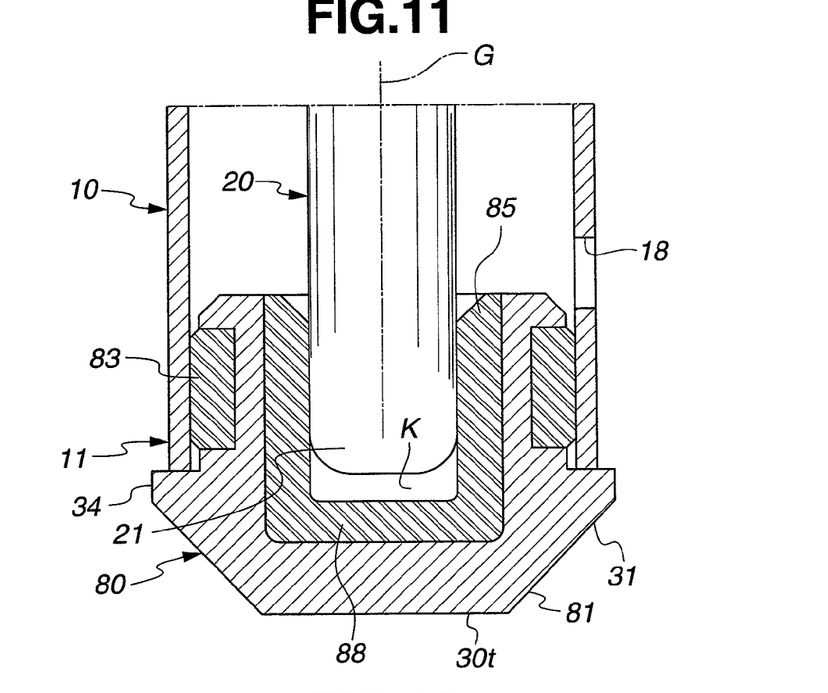
FIG. 11 is an enlarged view of the lower end portion of the liquid state detecting sensor, which is a principal potion and shows a leading end support member according to a further embodiment.
Figure 12:
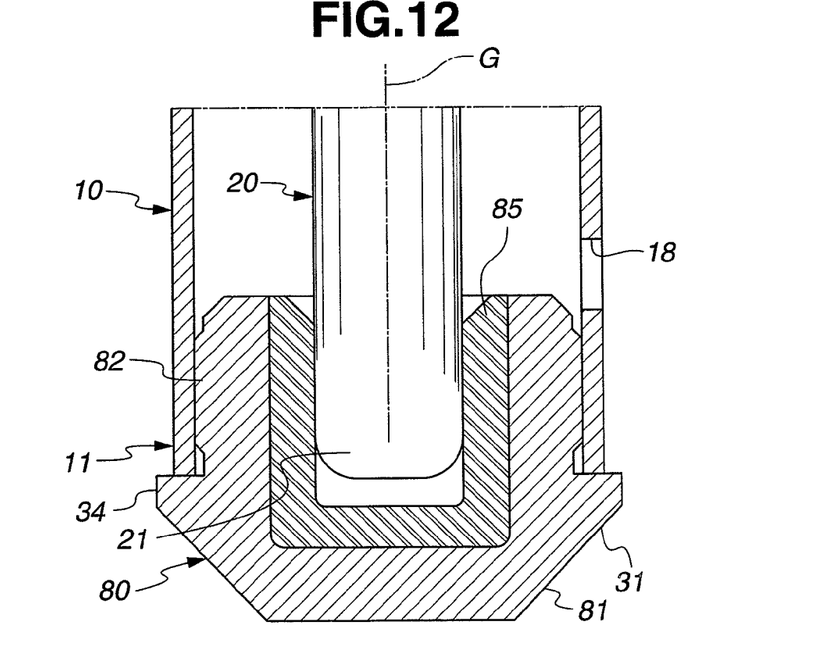
FIG. 12 is an enlarged view of the lower end portion of the liquid state detecting sensor, which is a principal potion and shows a leading end support member according to a further embodiment.

FIG. 11 shows a further embodiment of the present invention. The leading end support member 80 in this embodiment is not formed with such cuts 36, through hole 33t at the bottom 30t and protrusions 35 as described above but except for such difference, is generally substantially similar to the rubber elastic body described above and differs only in that the portions including the inner and outer circumferential surfaces are formed by elastic bodies 85 and 83. Namely, the leading end support member 80 includes a hollow cylindrical elastic body (e.g., rubber) 85 provided by adhesive or the like to the outer circumferential surface of a leading end support member main body (core member) 81 made of metal or hard resin and a bottomed, hollow cylindrical elastic body (e.g., rubber) provided similarly to the inner circumferential surface of the main body 81. In the meantime, since the leading end support member is not provided with a through hole at the bottom 30t, the outer tubular electrode 10 has at a near lower end portion a liquid inlet and outlet port 18 which extends through the near lower end portion.

Also in case the leading end support member 80 shown in FIG. 11 is used, an effect similar to that of the above-described embodiments can be attained except for the difference in effect resulting from the above-described difference in structure. In the meantime, the leading end support member 80 employed in this embodiment is adapted for insertion under pressure into a place outside the leading end or the near leading end portion of the inner electrode 20 and inside the outer tubular electrode 10 and is configured, before the insertion under pressure, so that the outer diameter of the outer circumferential portion where the elastic body 83 is provided is a little larger than the inner diameter of the outer tubular electrode 10 and the inner diameter of the inner circumferential portion where the elastic body 85 is provided is a little smaller than the outer diameter of the inner electrode 20. In the meantime, in FIG. 11, a gap (space) K is provided between the bottom 88 of the elastic body 85 at the inner circumferential surface and the leading end portion 21 of the inner electrode 20 with a view to absorbing a dimensional error in assembly. However, the elastic body 85 providing the inner circumferential surface may be formed into a simple hollow cylindrical shape and not provided with such a bottom 88.

While in the above-described embodiment both the inner and outer circumferential surfaces of the leading end support member 80 are described as being formed by the elastic bodies 85 and 83, the elastic body 83 at the outer circumferential surface in the above-described embodiment may not be provided and the leading end support member 81 may be provided with the elastic body 85 only at the inner circumferential surface. In this instance, it is desirable that the inner diameter of the elastic body 85 is set a little smaller than the outer diameter of the inner electrode 20. On the other hand, the portion (outer circumferential surface) 82 corresponding to (fitting in) the inside of the outer tubular electrode 10 of the leading end support member main body 81 may be fixed to the inside (inner circumferential surface) of the outer electrode 10 by small interference fit or by adhesive if necessary.

Figure 13:
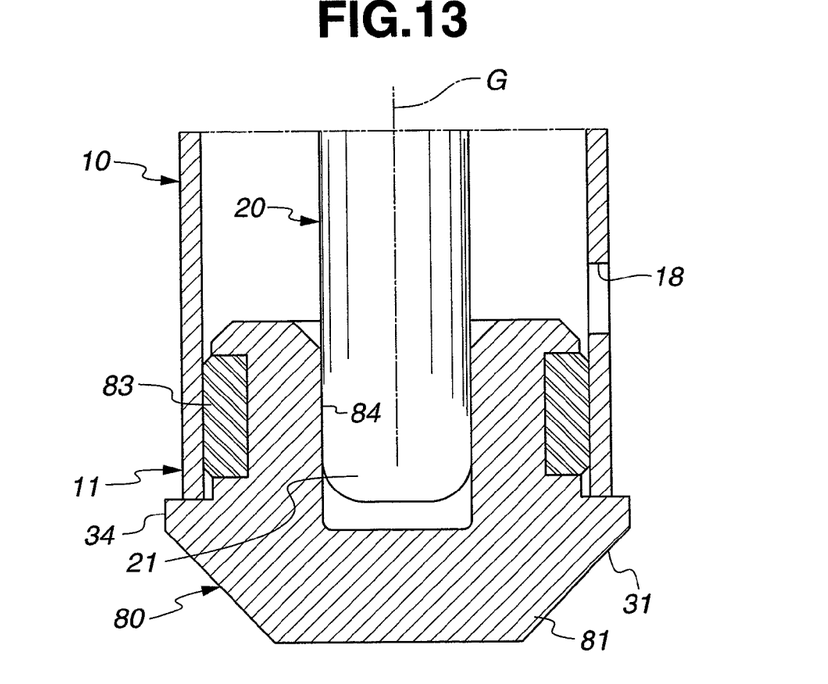
FIG. 13 is an enlarged view of the lower end portion of the liquid state detecting sensor, which is a principal potion and shows a leading end support member according to a further embodiment.

Similarly, for example, as in the leading end support member 80 shown in FIG. 13, the leading end support member 81 may not be provided with the elastic body 85 at the inner circumferential surface as in the above-described embodiment but may be provided with only the elastic body 83 at the outer circumferential surface. Namely, in this instance, the inner diameter of the inner circumferential surface 84 corresponding to the outside (outer circumferential surface) of the inner electrode 20 of the leading end support member main body 81 may be set so that the leading end support member is fixed by slight interference fit but in case the inner electrode 20 has an insulation layer at the outer surface as described above, it is desired that the inner circumferential surface 84 and the outer surface of the inner electrode 20 are bonded together by adhesive and thereby fixed to each other. In this instance, the leading end support member main body 81 is disposed on the outer circumferential surface of the leading end or the near leading end portion of the inner electrode 20 as a so-called collar (ring), and the main body 81 is elastically supported on the inside of the outer tubular electrode 10 by means of the elastic body 83 at the outer circumferential surface. In this instance, in case of insertion under pressure, it is desirable that the outer diameter of the elastic body 83 constituting the outer circumferential surface is a little larger than the inner diameter of the outer tubular electrode by an amount corresponding to the forced insertion.

Figure 14:
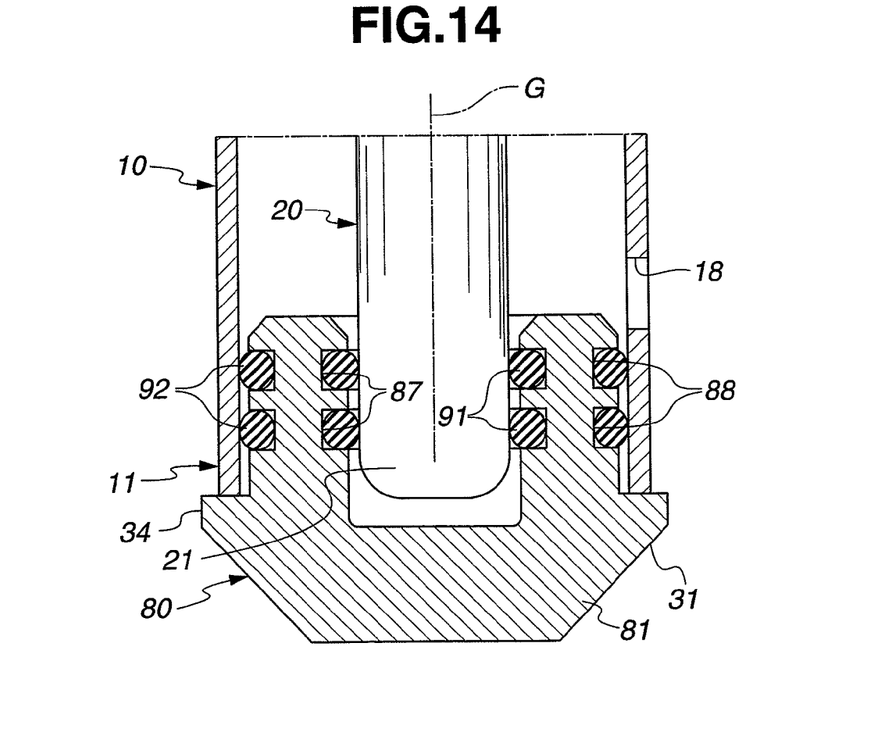
FIG. 14 is an enlarged view of the lower end portion of the liquid state detecting sensor, which is a principal potion and shows a leading end support member according to a further embodiment.

The leading end support member 80 shown in FIG. 14 is a modification of the embodiment shown in FIG. 11. In this embodiment, the leading end support member main body 81 has at the outer circumferential surface and about the axis G circumferential grooves 87 and 88, and elastic bodies 91 and 92, for example, in the form of O-ring and formed by rubber packing are disposed (mounted) the respective grooves 87 and 88, in place of the elastic bodies 85 and 83 in FIG. 11. In this manner, according to the present invention, the elastic body for enabling the leading end support member to elastically support the leading end or the near leading end portion of the inner electrode on the inside of the outer tubular electrode can be formed variously.

In the meantime, also in case the leading end support member having an elastic body at least one of the outer circumferential surface and the inner circumferential surface of the leading end support member main body 81, it can be said that a suitable material for the elastic body is rubber. However, as an elastic body in the present invention can be used various springs made of metal or hard plastics, which have a springing property.

Further, while in the above-described embodiment the inner electrode has been described as a metallic bar in the form of a solid pillar, it may well be a square pillar and need not be solid but may be hollow tube-shaped (pipe-shaped). Further, the outer tubular electrode needs not be a round tube but square tube.

In the meantime, while in the above-described embodiment urea water has been described as an example of liquid that is an object to be measured, this is not for the purpose of limitation. Further, if liquid that does not have an electrical conductivity as urea water (electrically non-conductive liquid) is an object to be measured, it is not necessitated to form an insulation layer on the outer circumferential surface of the inner electrode. When this is the case, since there is a difference in dielectric constant between the air and the liquid that is an object to be measured, a variation in the electrostatic capacity can be detected by measuring the electrostatic capacity between the inner and outer electrodes.

Further, while a liquid level has been described as an example of the liquid state that is the object to be detected by the liquid state detecting sensor, the liquid state can be, in addition thereto, the density of liquid, the degree of deterioration of liquid, the quality of liquid or the degree by which foreign matter is mixed with liquid. Namely, the sensor of the present invention can be widely used in detection of various states of liquid by measuring the electrostatic capacity between two electrodes.

Further, while in the above-described embodiment the sensor has been described and shown as being disposed in a state of hanging from above, the present invention can be embodies similarly in the sensor that is disposed at the bottom of a liquid container such as a tank in such a manner as to stand upright, contrary to the above-described embodiment.

The invention claimed is:

1. A sensor for detecting a state of liquid contained in a container comprising:
   an outer tubular electrode made of an electrically conductive material;
   an inner electrode made of an electrically conductive material and disposed concentrically within the outer tubular electrode:
   a base end support member supporting base end portions of the outer tubular electrode and the inner electrode in a way as to provide insulation therebetween; and
   a leading end support member elastically supporting a leading end portion of the inner electrode on an inside of a leading end portion of the outer tubular electrode,
   wherein the leading end support member has at an inner circumferential surface a plurality of inward protrusions that are arranged with angular intervals and configured to support the leading end portion of the inner electrode.

2. A sensor according to claim 1, wherein the inward protrusions have guides for guiding insertion of the inner electrode into the leading end support member, the guides being so shaped as to flare in the direction in which the leading end support member is inserted under pressure.

3. A sensor according to claim 2, wherein each of the guides includes a rounded chamfer.

4. A sensor according to claim 2, wherein each of the guides includes an oblique chamfer.

5. A sensor according to claim 1, wherein the leading end support member has a bottomed tubular shape and includes a through hole at a bottom and communication recesses between the inward projections, the through hole and the communication recesses cooperating with each other to constitute a flow passage through which the liquid flows into and out of the outer tubular electrode.

* * * * *